UNITED STATES PATENT OFFICE.

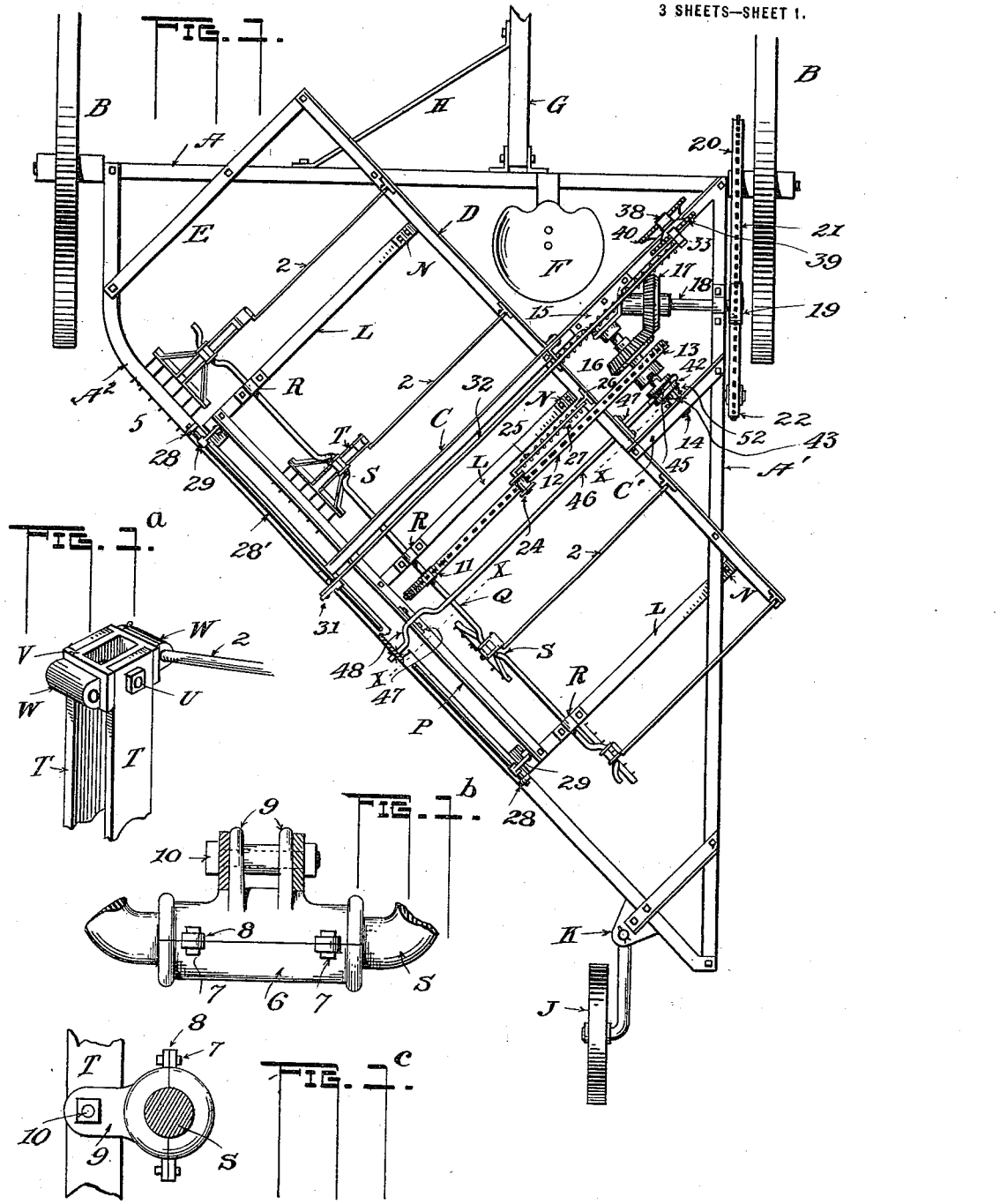

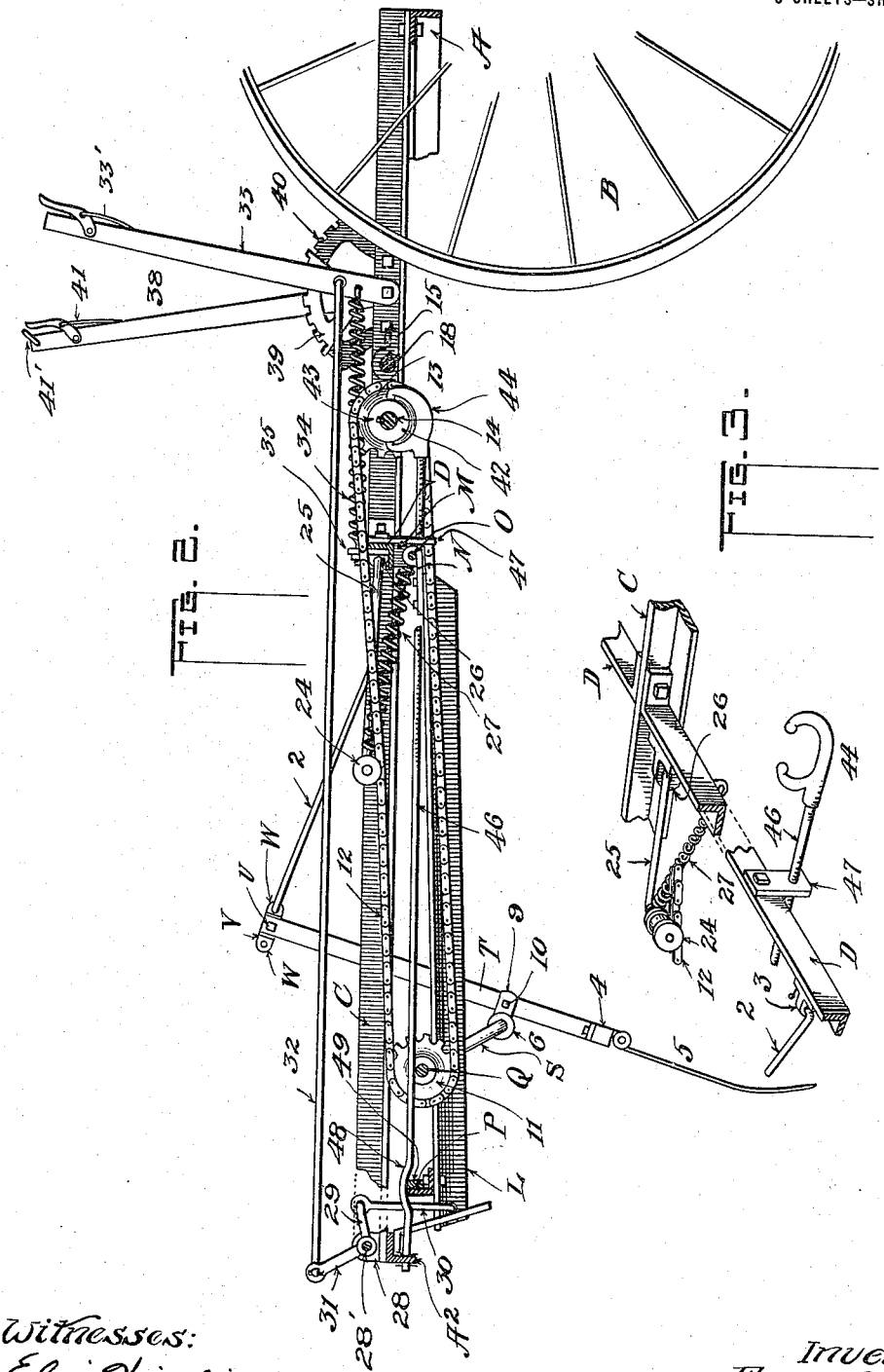

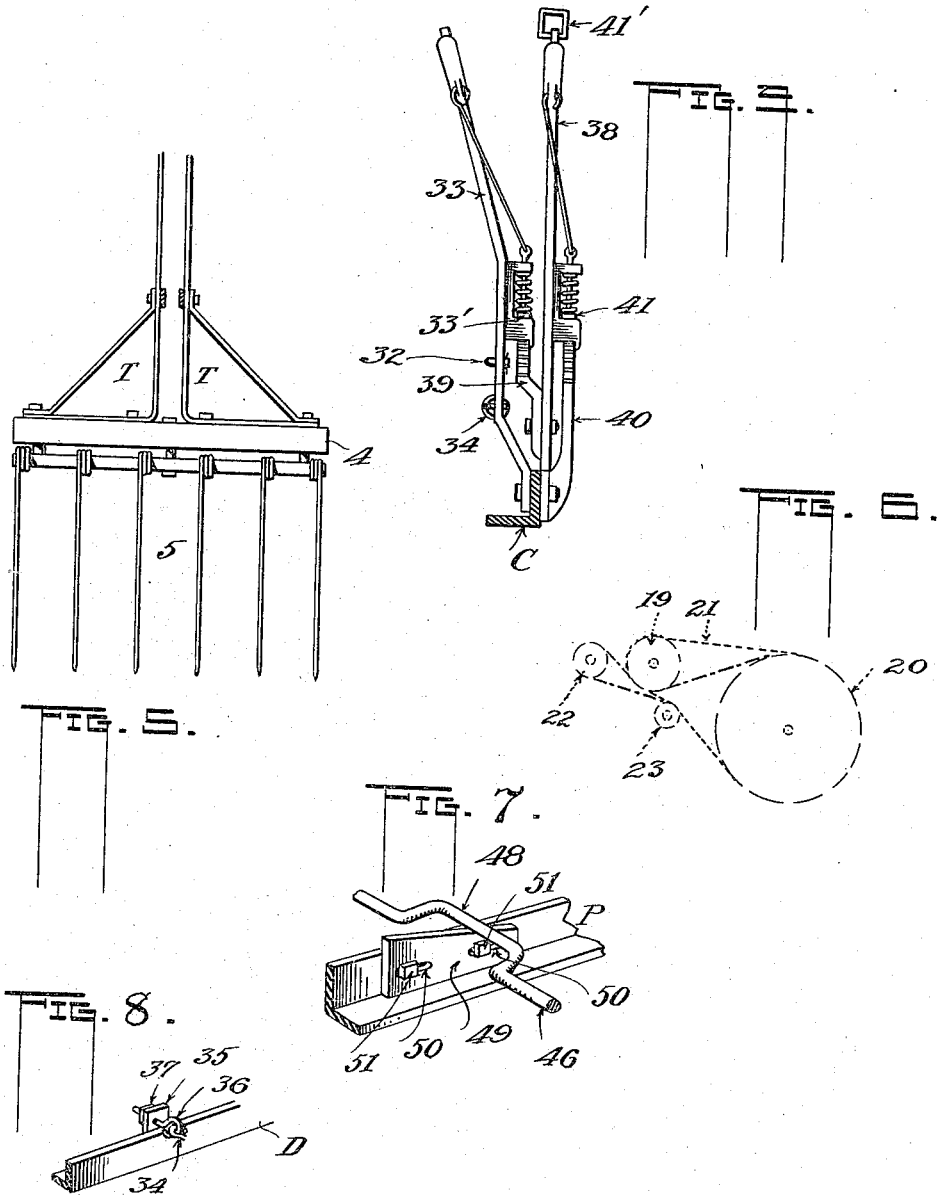

ERNEST C. SMITH, OF PEORIA, ILLINOIS, ASSIGNOR TO ACME HARVESTING MACHINE CO., OF PEORIA, ILLINOIS, A CORPORATION OF WEST VIRGINIA.

SIDE-DELIVERY RAKE.

1,146,966.    Specification of Letters Patent.    Patented July 20, 1915.

Application filed July 20, 1911. Serial No. 639,676.

*To all whom it may concern:*

Be it known that I, ERNEST C. SMITH, citizen of the United States, residing at Peoria, in the county of Peoria and State of Illinios, have invented certain new and useful Improvements in Side-Delivery Rakes; and I do hereby declare that the following is a full, clear, and exact description of the invention, which will enable others skilled in the art to which it appertains to make and use the same.

This invention relates to improvements in rakes of the side delivery type.

It has for one of its objects the provision of a tool that is convertible from a rake to a tedder and vice versa.

Another object is the provision of a rake that can be reversed in its direction of drive in order to adapt it for a side delivery rake or a hay tedder.

Still another object is to provide in a tool of this type a form of mechanism by which the raking devices thereof are allowed to "float" or to adapt themselves, as a whole, to the uneven surface of the ground passed over.

Still another object is to provide a floating raking frame, or the frame that carries the raking devices, and also to provide for the positive control of said raking frame by positively locking it at any desired height and to provide also, peculiar means for automatically throwing the driving gear out of engagement when the raking devices are raised from the ground.

Other objects and advantages in addition to these will appear in the following specification and certain novel structures will be brought as the description proceed aided by the accompanying drawings wherein:—

Figure 1 is a plan of the rake. Fig. 1$^a$, in perspective, shows the upper portion of one of the arms of a raking device. Fig. 1$^b$ is a plan of a portion of a crank and a bearing. Fig. 1$^c$ is a cross section of the crank shown in Fig. 1$^b$, also the bearing shown in that figure. Fig. 2 is a sectional elevation of the machine on line $x$ $x$ Fig. 1 as seen in the direction of the dart. Fig. 3, in perspective, shows a portion of the main frame and some of the operating parts. Fig. 4 is an elevation of a pair of operating levers for controlling the raking devices. Fig. 5 is an elevation of part of one of said raking devices. Fig. 6 is a diagram showing the manner of reversing the direction of drive. Fig. 7, in perspective, shows a portion of a raking-frame, a crank-shaft, and an adjustable member on said frame to engage said shaft, and Fig. 8, in perspective, a part of the main frame and an adjustable eye to receive the end of a spring.

I am aware of a hay tedder in which the raking members are permitted to float in the raking operation but I am not aware of the particular means shown and to be described herein in a side delivery rake or providing for this floating feature and wherein the raking members through an auxiliary frame are suspended from the main frame through free acting means that permits free and unrestricted vertical movement, at times, except as to the limit imposed by said free acting means. Again, there is the advantage of a simple construction whereby a change in the direction of drive and position of the raking devices can be had to transform the rake into a tedder thereby making the machine of double value though this adaptability is not particularly new.

The main frame is preferably made up of angle-bars one of the parts being represented by A. It lies at the front of the machine between the main carrying wheels represented at B and secured to and extending rearwardly from this member and at right angles to it is a side member A′ to whose rear end is attached a third member A$^2$ extending forward at about an angle of 45° to the first two members and secured to the member A, both members A′ and A$^2$ being close to the wheels so as to make a wide and strong frame. Other frame portions are also employed one of which is indicated at C, its ends being secured to the frame members A and A′ and the member A$^2$. This portion C practically divides the frame into two halves and besides forming a strong brace carries certain parts of the mechanism to be described. Mounted upon the member A is the usual seat F and at G is the usual tongue. At the rear of the frame is a caster-wheel J having a bearing in any suitable bracket K secured to the frame member A². Lying across the parts A and A' and the portion C substantially parallel to the member A², is a member D to one extremity of which is secured the end of a member E its other extremity being secured to the member A². All these parts constitute the main frame and are preferably of angle-bars, as stated, since such a frame is light and strong and furnishes a very rigid structure for carrying the parts now to be described.

Depending from and hingedly attached to the bar D of the frame is a series of members L preferably angle-bars, but three of them being shown in the present instance. These lie parallel to one another and to the central member C. The manner of hanging these bars is clearly shown in Fig. 2 in which M indicates a hanger for each bar which is secured in any good way to the bar D.

N indicates a strap secured to each of the said members L and pivotally suspended from the hanger by means of bolt O. The rear ends of the members L are cross connected by a bar P bolted to them all constituting a strong, rigid but light frame. A shaft Q has its bearings at R upon each of the said members L near their rear ends and this shaft has a series of cranks S formed in it at various angles to receive the raking members. The latter, as shown in Figs. 1ª and 5, are preferably made up of two flat bars T secured by means of a bolt U to a casting V the latter having an extension W at opposite sides either of which receives the bent end of a rock-arm 2, Fig. 1, whose other end is held in a bracket 3 secured to the front member D as shown in Fig. 3. The lower extremities of the bars T are bent at right angles in opposite directions and bolted to a bar 4 from which are suspended the usual rake teeth 5 in any suitable manner; the form of said teeth in side elevation being shown plainly in Fig. 2.

Upon each crank S is a split boxing 6 whose parts are bolted together by means of bolts 7 extending through lugs 8. Cast with one of the boxing sections are two ears 9 to which the arms T of the raking device are secured by means of bolts 10.

Mounted on the shaft Q is a sprocket wheel 11 driven by a chain 12 for transmitting rotary motion to said shaft. Said chain is driven from a sprocket 13 rotatable on a shaft 14 having its bearings at one end in a casting 15 secured on the central member C of the frame and at its other end upon a member C' of said frame. This shaft carries a gear 16 which meshes with a similar gear 17 mounted on and driven by a shaft 18 also having its bearings in the casting 15, and on the frame member A', there being a sprocket wheel 19 on said shaft 18 driven from a master-sprocket 20 on the hub of one of the wheels B through a chain 21. The latter is adapted to drive the sprocket 19 in either direction this being possible through the use of an idler sprocket 22. As stated, it is the desire that the implement be adapted both for a side delivery rake and a tedder and for this reason I provide means for reversing the direction of drive of the said shaft 18 whereby the shaft Q will be reversed in its direction of rotation. It is noted in Fig. 6 that the sprocket chain is represented diagrammatically in two different adjustments whereby to impart these two different directions of drive. In one case, for example, the chain extends around the master-sprocket 20 and around the sprocket 19 thereby driving the latter in the same direction as said master-sprocket. In the other arrangement the chain after extending around the said master-sprocket passes beneath the sprocket 19 and over the idler 22 and back to the master-sprocket. The same direction of drive of the latter, of course, will impart a reverse direction of rotation through the sprocket 19. Preferably an idler 23 is used which answers as a tightener and it is necessary in the arrangement shown to add to or take away from the chain a number of links in order to obtain the two driving conditions. However, other arrangements may be employed whereby the direction of drive may be reversed since the particular means employed is not important. 24 represents a roller to bear upon the chain 12 and answering as a chain tightener; said roller being carried on an arm 25 pivoted to a bracket 26 on the frame member D (see Fig. 3) and controlled by a spring 27. Used as a rake the raking devices T carried by the crank shaft Q take the position shown in Fig. 2, that is, with the ends of the rake teeth 5 pointing forward. The rotation of the crank shaft will impart the usual elliptical orbit to the teeth due to the rock-arm 2 in control of the raking devices but as this action is well understood it will not be further dwelt upon. When the direction of rotation is reversed to produce a tedder the raking devices are reversed in position, that is to say, the bolt 10 of the boxing 6 and the rock-arm 2 are removed from the extension 9 and W respectively and after the device has been reversed, by imparting a half turn thereto, the said bolt 10 and arm are replaced.

The floating operation for the rake frame will now be described together with the mechanism for the same.

Mounted in suitable bearings 28 upon the frame portion A² is a rock shaft 28' which carries an arm 29 near each end extending forwardly and from which is suspended a link 30 having pivotal connection with and for suspending the end bars L before described. Substantially midway of the length of the shaft is secured an arm 31 having a position substantially at right angles to the arms 29. The free end of this arm has a rod 32 pivotally connected therewith, the other end extending forward and having attachment to a lever 33 pivoted upon the central member C within reach of the operator's seat. A spring 34 is attached at one end to the said lever and is adjustable at its other end in a bracket 35, Fig. 8, secured on the member D of the frame, as shown, the adjustment being made through an eye bolt 36 and a nut 37 thereon. Also pivoted on the member C at the same pivot point as the lever 33 is a lever 38 carrying at its side nearest the lever 33 a notched sector 39 with which the latch 33' of said lever 33 engages. Secured to the member C is a sector 40 with which may engage the latch 41 of the lever 38. Movement of the lever 33 will impart a vertical movement to the raking frame L, P, through the mechanism described, and said frame can be adjusted to any desired height and there sustained by the sector 39 provided the lever 38 is held stationary by the sector 40. When it is desired to permit the raking frame and its raking devices to have free vertical movement or "float" the latch of the lever 38 may be held free of the sector 40 by means of a link 41' carried by said lever. Both levers are now free to swing thus permitting the vertical floating movement of the raking devices as they meet the undulating surface of the ground. Upon the shaft 14, which carries the gear 16 is a clutch-member 42 rotatable with said shaft by means, for instance, of a feather 43 but shiftable along said shaft and adapted to engage the hub of the sprocket 13 which also constitutes a clutch-member. 44 is a fork lying in a groove 45 of the portion 42 said fork being part of a rock shaft 46 extending rearwardly through a hanger 47 secured to the frame-portion D and through the frame-portion A², and provided with a crank 48. Mounted upon the vertical web of the portion P of the rake frame is a member 49 having horizontal slots 50 for receiving bolts 51 which extend into the said portion P. The upper edge of the member is inclined at an angle to the upper edge of the portion P, as shown, and said member lies below the cranked portion 48.

A spring 52 is interposed between the frame portion C' and the clutch portion 42, the constant tendency of which is to shift said clutch-portion into engagement with that of the sprocket wheel 13. When in the act of raising the rake-frame the member 49 meets the crank 48 and rocks the shaft 6 in a direction to separate the clutch portions and compress the said spring.

The rake-frame is adjusted by means of the lever 33 so that the lowermost position of any one of the raking members will be about at the ground level and all of the members will work quite close to said level and thereby all of the hay will be gathered. However, the frame can be placed in any one of several adjustments while able to have the desired floating action. Also by permitting the raking frame to float the excessive strains placed upon the mechanism, as this type of rake as ordinarily constructed, is entirely eliminated. These strains are caused by the raking members striking high placed in the ground or by the wheels dropping into low places, or both. It is quite evident that in floating the members will yield as these conditions are met and no damage can result. And in addition to the above the draft is necessarily much lighter than in rakes in which these parts are not free to rise and fall.

The floating action in my rake is of double value since whether used as a rake or a tedder its advantages are present and can be utilized.

My rake and tedder is distinguished from others of its class by the fact that others have no elastically suspended auxiliary frame for the raking members where the main frame is supported at the front and rear. I am aware, however, of two certain two-wheeled hay tedder structures of the sulky type, more or less obsolete in form, that combine an elastic auxiliary frame pivoted in one case on the "thills" or shafts between which the draft animal is placed, and in the other case pivoted on a frame, the practical equivalent of the thills. In practice with such a form, the jerky vertical motions imparted to the thills or to the frame by the animal transmits a like up and down jerky movement to the rake teeth so that they are lifted off the ground at each step. This in a tedder is not a great advantage as is obvious, but if used as a rake, of the side delivery type especially, where the field must be raked clean the results from this type would be far from satisfactory because it would be practically impossible to hold the teeth of the raking devices upon the ground. However, by suspending the auxiliary frame from a part that is supported at both front and rear so as to acquire none of the up and down jerky motions of the two-wheeled type of machine the rake teeth maintain a substantially constant level and get all of the hay and more of the hay than can be gathered by the present-day type of said delivery rake that does not include a spring suspension of its raking devices for holding them elastically upon the ground.

The lever 38 carrying the sector 39 is employed to lift the raking frame from its operating position or to lower it to that position and at such times the frame is made to release the clutch-portion or permit them to engage as the needs of the case demand. In the floating action the spring 34 aids in assisting the raking frame to rise as the teeth 5 strike obstructions said spring practically counterbalancing the weight of the frame and its parts and provides what may be termed an elastically suspended raking frame.

The spring in being attached to the lever 33 is placed under slightly more tension as the lever is moved rearwardly in permitting the raking-frame to descend to a lower position and thus is in better condition to support the latter and, contrariwise, when the frame is raised the tension of the spring is slightly relaxed.

In addition to what has been described with regard to the frame L and the peculiar structure in control of it the following may be stated in order to lead to a clearer understanding of the arrangement of the parts and reasons for their use.

When the latch 41 of the lever 38 is held free of the sector 40 said lever is moved to the forward limit of the said sector against any usual stop, not shown, by the weight of the said frame L and said lever which carries the sector 39 thus carries with it the lever 33. When the lever 38 lies at the said forward limit of the said sector and the lever 33 is at the forward limit of the sector 39 the frame L occupies its lowest position. The frame is now free to float upward should obstructions be encountered and this action will cause the lever 38 to move rearwardly or toward the rear extremity of its sector 40 carrying with it the lever 33 and sector 39. The obstruction passed, however, the lever 38 immediately goes forward again due to the weight of the frame which for the best results cannot be entirely balanced by the pull of the spring 34.

The higher adjustments of the frame for floating at higher positions are made by locking the lever 33 rearwardly on the sector 39 being still free for the floating action.

Of course, if the rake were operated with the frame L rigid relative to the carrying frame the lever 33 and sector 39 would not then be needed since the required changes in elevation of the frame would be made through the lever 38 and sector 40.

The system of spring suspension of the rake-frame from the main-frame in my device is novel and lends greater elasticity to the vertical movements of the said rake-frame than by other methods from the fact that the spring 34 is quite long and is of the form that suspends the weight rather than being compressed under said weight. Because of this fact the spring can be made as long as desired to thus give a wider latitude of movement and of sensitiveness of movement to the rake-frame. As distinguished from the art, also, the attachment of the spring is between the main frame and the lever as a suspension member and for that reason can be made quite long as stated in order to obtain the required sensitive action mentioned.

It is not my wish to be confined to any particular structure shown and described since those described and shown are mere preferences and are susceptible to changes that may suggest themselves to a skilled person.

Having thus described my invention, I claim:—

1. In a side delivery hay rake, the combination of a main frame and its front and rear carrying wheels, a rake frame pivotally suspended at its forward portion to said main frame and including raking devices, the rear portion of the rake frame lying adjacent a part of said main frame, a lever pivotally mounted between its ends on said part of said main frame, the rake frame being suspended from one arm of said lever, and mechanism operatively attached to the other arm of the lever for elastically suspending the rake frame.

2. In a side delivery hay rake, the combination of a main frame and front and rear supporting wheels, a rake frame pivotally suspended at its forward portion to the main frame forward of the rear supporting wheel including raking devices, a lever pivoted between its ends on the main frame rearward of the rake frame and having the latter suspended from one of its arms, a lever mounted on the main frame and operatively connected with the other arm of the first named lever, and elastic means attached to the second described lever and the main frame for elastically suspending the rake frame.

3. In a side delivery hay rake, the combination of a main frame and front and rear supporting wheels, a rake frame pivotally suspended at its forward portion on the main frame forward of the rear supporting wheel and including raking devices, a lever pivoted between its ends on the main frame opposite the rear portion of the rake frame and having the latter suspended from one of its arms, a second lever mounted on the main frame, a member connected to it and operatively engaging the other arm of the first described lever, and an elastic member attached to the second described lever and extending rearward and attached to the main frame.

4. In a side delivery hay rake, the combination of a main frame and front and rear supporting wheels, a rake frame pivotally suspended at its front portion to the main frame forward of the rear supporting wheels, a shaft journaled on the rake frame including cranked portions and rake arms operated thereby, a lever pivoted between its ends on the main frame rearward of the rake frame and having the latter suspended from one of its arms, and mechanism mounted on the frame and operatively connected to the other arm of the lever, including means to elastically suspend said rake frame.

5. The combination with the main frame of a hay rake, of a rake-frame suspended therefrom, a raking device carried by the latter, driving mechanism therefor including a clutch, means for raising and lowering the rake-frame, and clutch controlling means lying in the path of the frame and operated by it in its raising movement to disengage the clutch.

6. The combination with the main frame of a hay rake, of a rake-frame suspended from it, a raking device carried by the latter, driving mechanism including a clutch, a clutch disengaging devise lying above said rake frame and in the path thereof, and means to move the frame against said device to disengage the clutch.

7. The combination of a wheel frame, an auxiliary frame pivotally suspended at its forward side to said frame at an angle to the line of advance, its rear side adapted for a free vertical movement, a shaft journaled across the frame, raking devices mounted thereon, means to rotate the shaft including driving mechanism mounted on the main frame, and a clutch, means to raise the auxiliary frame, and means carried on the main frame operated by the said auxiliary frame to disengage the clutch when said auxiliary frame is raised.

8. The combination of a wheel frame, an auxiliary frame pivotally suspended at its forward end from said wheel-frame, a rock-arm mounted on the main frame and having the auxiliary frame suspended from it, a lever controlling the rock-arm, a shaft carried on the end of the auxiliary frame controlled by the rock-arm, raking devices carried by it, means to rotate the shaft including driving mechanism mounted on the wheel-frame and operated from the ground wheel and including a clutch, and means to open and close the clutch including a part engaged by a part of said auxiliary frame.

9. A side delivery rake including, in combination, a wheeled frame, an auxiliary frame hingedly connected at its forward side thereto adapted for a vertical movement relative to the wheeled frame and including a raking device, a lever mounted on the wheeled frame and supporting the auxiliary frame at its rear, a second lever mounted on the said wheeled frame, and mechanism connecting the levers adapted by an adjustment of said second lever to adjust the auxiliary frame vertically.

10. The combination of the main frame of a hay rake, a rake-frame suspended from said main frame and including raking devices, said frame arranged to have vertical movement, a lever for the rake frame including a connection therewith, means to elastically suspend the said rake-frame, a second lever, and mechanism connecting the levers through which to operate one of the levers from the other and adjust the said rake-frame.

11. The combination of the main frame of a hay rake, a raking-frame suspended therefrom and arranged to have free vertical movement, and including raking devices, a lever including a connection with said raking frame to adjust it to a given position for work, a second lever, mechanism between it and the first lever by which to operate said first lever to adjust the raking-frame to a position where its raking devices will be inoperative, and means to rotate the said raking devices including a clutch, and means operated by the rake frame in its raising movement to disengage said clutch.

12. A hay rake including a wheeled main-frame, an auxiliary frame hingedly connected at its forward end and to said main frame and adapted for vertical movement with respect to it, a bell-crank-lever mechanism mounted on said main frame including a link connecting one arm of the crank and the rear end of said auxiliary frame, a hand lever mounted on the main-frame, a rod pivotally connected at opposite ends to the lever and the other arm of the bell crank, and a spring attached at one end to the hand lever and at its other end to a part of the main structure of the rake between the said hand lever and the bell-crank.

13. A hay rake including a wheeled main-frame, an auxiliary frame hingedly connected at one end to it and adapted for vertical movement, a bell-crank-lever mechanism mounted on the said main frame including a link connecting one arm of the crank and the free end of said auxiliary frame, a hand lever including a latch, a member connecting the lever and the other arm of the bell-crank-lever mechanism, a spring attached at one end to the main-frame between the bell-crank and the said hand-lever and at its other end to the latter, a second hand lever including a latch, a sector secured on the frame adjacent said lever, and a sector carrier by and movable with the last named lever and engaged by the latch of the first named lever.

14. The combination with the main frame of a side delivery hay rake, of a raking frame elastically suspended from said main frame, reciprocating raking devices carried by said raking frame, means on the main frame to impart movement to said devices including a clutch, a lever mechanism connected to the raking frame for elevating it and means engaging a part of the clutch and engaged and moved by the raking frame when the latter is moved by the lever.

15. In combination, the main frame of a side delivery rake, a rake-frame pivoted at its forward end thereto, means to elastically suspend the rake-frame from the main frame including a lever mechanism connected to said rake-frame for changing the elevation of the same, the said spring being connected to said mechanism and an adjustable lever mounted on the main frame and provided with a sector movable with it with which the lever mechanism is adapted to engage.

16. The combination in a side delivery rake of a vertically movable frame including raking devices, a lever, mechanism connecting said lever with the said raking frame, mechanism to fix the lever in a desired adjustment, and a second lever on which a part of the last named mechanism is carried, the first named lever engaging said mechanism and means to secure the second lever in a desired adjustment.

17. The combination in a side delivery rake, of a vertically movable frame including raking devices carried by it, a lever including a latch, means connecting the lever with said frame, and a second lever including a part to receive the latch of the first said lever.

18. The combination in a side delivery rake of a main-frame, a frame movable vertically relatively to said frame, a lever pivoted on the main frame, a second lever including a sector fixed relative to and movable with it, a latch on the first lever adapted to engage the sector, means connecting the said first lever with the rake frame, and means to fix the second lever in position.

19. The combination in a side delivery rake, of a main frame, a rake-frame pivoted thereon and movable vertically relatively thereto, means to elastically suspend said rake-frame, a pair of levers, means pivotally connecting one of them with the rake-frame for imparting vertical movement to it, means to secure the other lever relatively to the main frame, and means to fix the two levers relatively, both adapted to move together and adapted also to have free movement.

20. The combination in a side delivery rake, of a main frame and ground wheels, a secondary frame carried by the main frame and disposed in an oblique position relatively to the line of advance, means to elastically suspend said secondary frame, a shaft mounted on said secondary frame including raking devices adapted for a reciprocating movement, means to rotate the shaft and including clutch parts, means normally tending to bring the clutch parts together, a pair of levers mounted on the main frame, means to, at will, connect one with the other, mechanism connecting one of the levers with the secondary frame, the latter adapted to disengage the clutch parts, and means carried by the frame to fix the other of said levers in position.

In testimony whereof I affix my signature, in presence of two witnesses.

ERNEST C. SMITH.

Witnesses:
W. I. SLEMMONS,
L. M. THURLOW.

Copies of this patent may be obtained for five cents each, by addressing the "Commissioner of Patents, Washington, D. C."